Oct. 29, 1968  W. B. EDWARDS  3,408,089
VEHICLE STEERING AND STABILIZING MECHANISM
Filed July 29, 1966  2 Sheets-Sheet 1
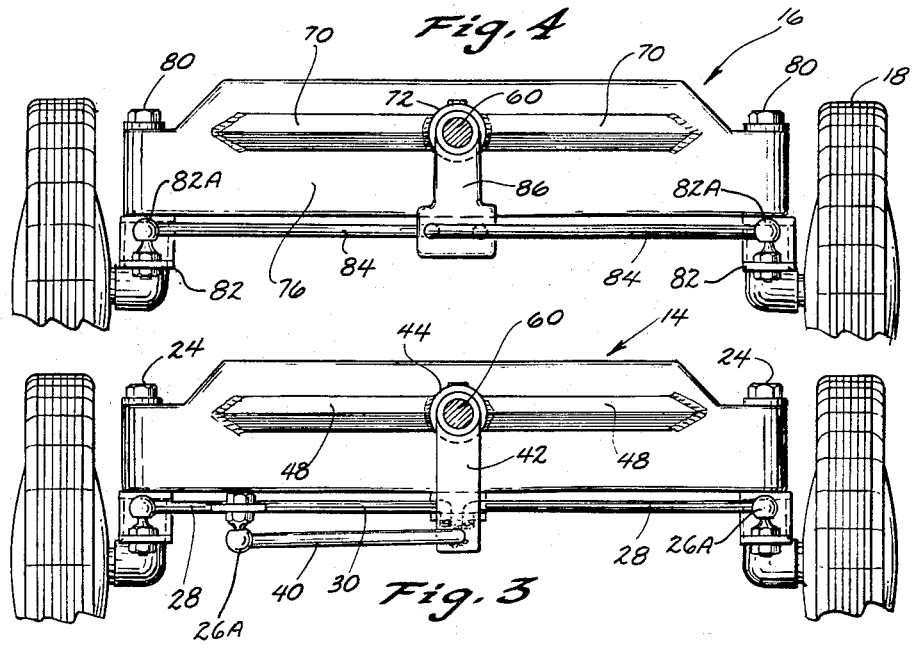
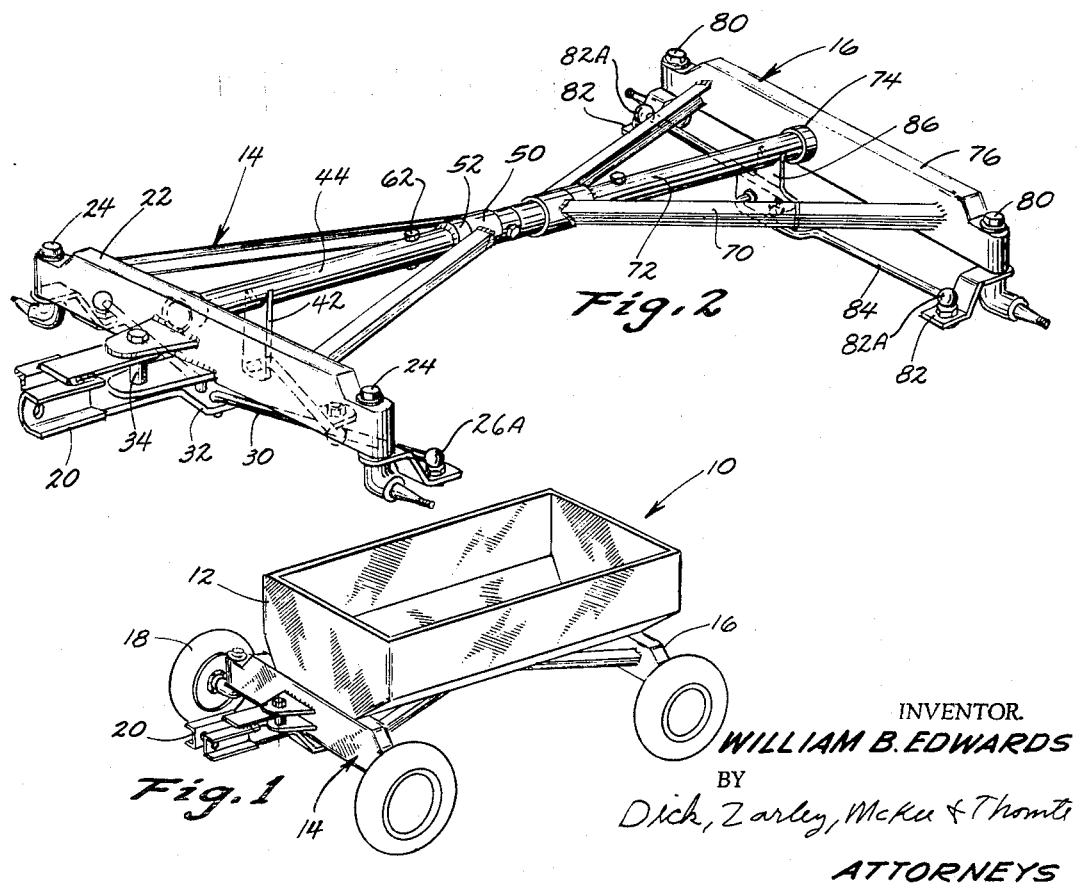
INVENTOR.
WILLIAM B. EDWARDS
BY
Dick, Zarley, McKee & Thomte
ATTORNEYS

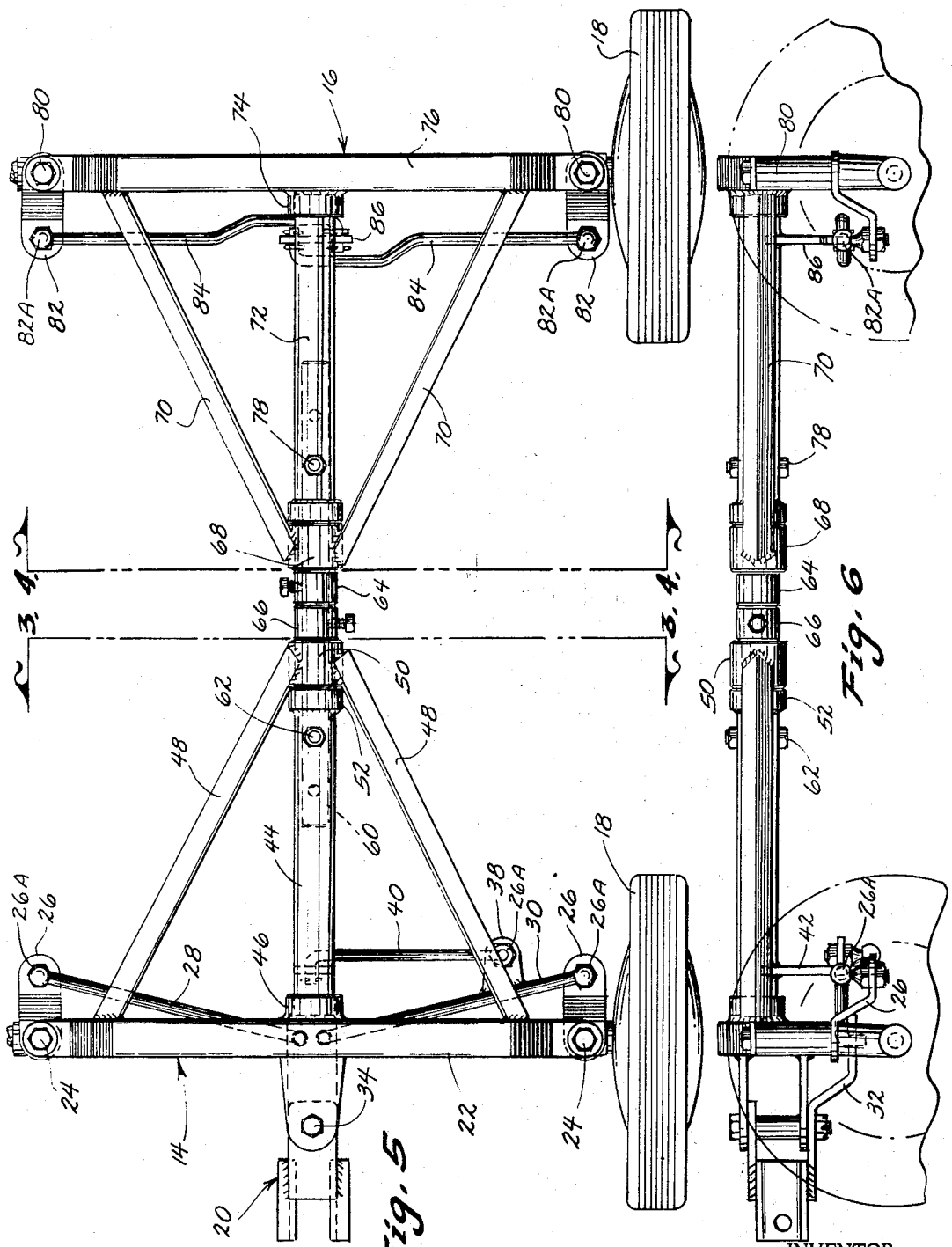

United States Patent Office 3,408,089
Patented Oct. 29, 1968

3,408,089
VEHICLE STEERING AND STABILIZING
MECHANISM
William B. Edwards, Coin, Iowa 51636
Filed July 29, 1966, Ser. No. 568,788
8 Claims. (Cl. 280—99)

ABSTRACT OF THE DISCLOSURE

A device having forward and rear frame sections freely rotatable relative to each other on a common rigid shaft extending therebetween and connected at its forward end by a single tie rod to one of a pair of tie rods extending to the front wheels and connected to a pair of overlapping tie rods extending to the rear wheels thereby eliminating twisting action on the wagonbox and providing improved tracking of the wheels upon a wheel falling into a depression.

---

A common problem with farm wagons or the like trailing behind a cornpicker for example, is that the wagon will not follow the cornpicker when turning and consequently the grain being unloaded from the cornpicker will miss the wagon and fall to the ground. Another common problem of conventional vehicles such as wagons is that when one wheel falls into a depression a severe strain or twist is imposed upon the entire frame.

Thus it is one of the principal objects of this invention to provide a vehicle having improved tracking capability and a vehicle that will follow a leading vehicle around turns.

Another related object of this invention is to provide a vehicle which includes front and rear frame sections which are adapted to rotate about the longitudinal axis of the vehicle independently of each other such that when one corner of the vehicle falls into a depression the entire frame is not subjected to undue strain and twisting.

Yet another related object of this invention is to provide a vehicle having a steering and stabilizing mechanism which provides for turning the front and rear wheels in opposite directions.

A related object of this invention is to provide a vehicle having a common center extendable shaft interconnecting the front and rear sections which rotatably interconnects the front and rear wheels wherein a single tie rod is connected to the shaft from one of the front wheel tie rods and a pair of overlapping tie rods are provided for interconnecting the rear wheels to the center shaft. This invention further provides for the tongue of the vehicle being connected directly to the inner ends of front wheel tie rods for pivoting the front wheels.

A further object of this invention is to provide a vehicle steering and stabilizing mechanism which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawing in which:

FIG. 1 is a reduced in scale perspective view of the vehicle of this invention;

FIG. 2 is a perspective view of the frame assembly including the steering and stabilizing mechanism;

FIG. 3 is a cross-sectional view taken along line 3—3 in FIG. 5;

FIG. 4 is a cross-sectional view taken along line 4—4 in FIG. 5;

FIG. 5 is a fragmentary top plan view of the vehicle frame assembly; and

FIG. 6 is a side elevation view of the vehicle in FIG. 5.

The vehicle of this invention is referred to generally in FIG. 1 by the reference numeral 10 and is shown to have a wagonbox 12 mounted on a front frame section 14 and a rear frame section 16. The sides of each of the frame sections 14 and 16 are provided with ground supporting wheels 18. The front frame section 14 includes a tongue assembly 20.

The front frame assembly is provided with a transverse frame member 22 having wheel axles 24 at its opposite ends for the wheels 18. The wheel axles 24 are L-shaped with the vertical portions having rearwardly extending arms 26. A pair of tie rods 28 and 30 extend inwardly to a point under the frame member 22 where they are pivotally connected to a tongue plate member 32 which is adapted to pivot about a vertically disposed pin 34 positioned on the forward side of the frame member 22. As seen in FIGS. 2 and 6, for example, the tongue member 32 projects downwardly and rearwardly under the frame member 22.

The tie rod 30 is provided intermediate its ends with a rearwardly extending arm member 38 which is pivotally connected to a tie rod 40 extending transversely of the vehicle frame to a pivotal connection with a downwardly extending member 42 rigidly connected to a rotatable shaft member 44 extending the length of the front frame section 14. The forward end of the shaft 44 is rotatably received in a sleeve member 46 positioned on the rearward side of the frame member 22 as seen in FIG. 5. Universal joints 26A are used on the outer ends of rods 28, 30 and 40, and should also be used on the inner ends thereof on larger wagons.

The front frame section 14 also includes a pair of rearwardly extending converging frame members 48 which are joined by a dollar member 50 mounted on the shaft 44. An annular shoulder 52 is provided on the shaft 44 in mating engagement with the collar 50 and to serve as a stop means.

The shaft 44 is hollow and receives telescopically at its inner end a connecting shaft member 60 which may be selectively bolted to the shaft 44 by a bolt member 62.

The connecting shaft member 60 includes rearwardly of the front frame section 14 a pair of spacer collars 64 and 66 which are adapted to matingly abut against a collar 68 on the forward end of the rear frame section 16. The collar 68 interconnects a pair of converging side frame members 70. The collar 68 in turn receives the rear end of the shaft 60 and includes a shaft 72 having its forward end rotatably mounted within the collar 68 and its rear end mounted in a bearing sleeve 74 on a transverse frame member 76 which interconnects the rear ends of the side frame members 70. A bolt 78 is selectively inserted through aligned openings in the shaft 72 and the inner shaft 60 whereby the shafts 44, 60 and 72 rotate as a unit within the bearing collars or sleeves 46, 50, 68 and 74.

The transverse frame member 76 of the rear frame section 16 includes L-shaped axles 80 on which the rear wheels 18 are mounted. Each of the upright portions of the axles 80 have forwardly extending members 82 each of which are pivotally connected by universal joints 82A to tie rods 84 which extend transversely to a downwardly extending plate member 86 mounted on the shaft 72. The inner ends of the tie rods 84 are disposed in overlapping relationship at their connection to the member 86 thereby providing improved control and tracking of the rear wheels. On larger wagons it is desirable to use universal joints 82A on the inner ends of the tie rods 84.

Thus it is seen that in operation the turning of the tongue 20 will transmit motion to the front wheels through the tie rods 28 and then through the tie rod 40 to the longitudinal center shaft 44 which is connected to the shaft 60 in turn connected to the frame section shaft 72. The rotational movement of the rear shaft 72 will impart motion through the outwardly extending tie rods 84 to the rear axles 80 and thus pivot the rear wheels in the opposite direction of the front wheels as the tongue 20 is rotated. It is seen that the entire front frame section 14 is rotatable independently of the rear frame section 16 since there is no rigid connection therebetween. The steering mechanism of this invention is greatly simplified by the provision of a single tie rod 40 connecting the rotating shaft 44 to the front tie rod 30. Depending on the length of the frame that is desired, the front and rear frame sections 14 and 16 may be extended relative to each other on the shaft 60 to the desired length by relocating the bolts 62 and 78. The spacing collars 64 and 66 may be used in the desired number as appropriate for the length of the frame that is desired.

It is seen by this arrangement that the front wheels and rear wheels turn in opposite directions and thus the wagon 10 will provide better tracking and consequently follow the turning leading vehicle, and thus avoid the "cutting of corners." Moreover, should any one of the wheels 18 fall into a depression, the frame section will pivot about its respective longitudinal shaft member without effecting the other frame section and consequently no strain or twist will be placed on the other frame section. If the wagon-box is appropriately supported on the frame sections no twisting action will be transmitted to it. It is also apparent that as one of the wheels falls into a depression that the wheel will have a tendency to turn accordingly and thereby provide additional control and assistance in moving out of the depression.

I claim:

1. A vehicle having front and rear frame sections, connecting means interconnecting said front and rear frame sections, wheels pivotally and rotatably connected to opposite sides of each of said frame sections, and steering means interconnecting said front and rear wheels for pivoting said front and rear wheels in opposite directions from a normally parallel relationship, a tongue member is pivotally connected to said front frame section, an ear extending from the pivotal axis of each front wheel, a tie rod pivotally interconnecting each ear to said tongue member to translate pivotal movement of said tongue to said front wheels, said steering means and said connecting means include a rotatable shaft extending between said front and rear frame sections, said front and rear frame sections being mounted on said shaft for independent rotation, said shaft being freely rotatable independently of said front and rear frame sections and the piovtal movement of said front and rear frame sections, a tie rod extending between said shaft and one of said front tie rods to impart rotational movement to said shaft upon said front wheels being pivoted, and rear tie rods extending from said shaft and being connected to an ear extending from the pivotal axis of each of said rear wheels to pivot said rear wheels upon rotation of said shaft.

2. The structure of claim 1 wherein said tongue member includes a portion extending substantially parallel to the longitudinal axis of said tongue downwardly and below said front frame section for pivotal connection to said front tie rods.

3. The structure of claim 1 wherein said shaft includes a vertical perpendicular portion and said rear tie rods are connected to said perpendicular portion in overlapping relationship on opposite sides of the longitudinal axis of said shaft.

4. The structure of claim 1 wherein said tie rod connecting said one tie rod to said shaft is the only means in the front frame section connected to said shaft for rotating said shaft.

5. The structure of claim 1 wherein said shaft assembly includes three shaft portions, said front and rear frame sections being on individual shaft portions and the third shaft portion rigidly interconnecting the other two shaft portions.

6. The structure of claim 5 wherein said shaft portions are telescopically interconected and adjustable means is provided for selectively extending and contracting said shaft portions relative to each other to vary the length of the vehicle frame.

7. The structure of claim 6 wherein an annular shoulder is formed on each of said first and second shaft portions and each of said front and rear frame sections have rigid V-shaped members converging toward each other and annular sleeves rigidly connected to the vertex of said V-shaped members and rotatably mounted on said third shaft member between said annular shoulders.

8. The structure of claim 1 wherein universal joint connections are connected to opposite ends of said tie rods to permit said tie rods to pivot in more than a single pivotal plane.

References Cited

UNITED STATES PATENTS

| | | | |
|---|---|---|---|
| 1,618,094 | 2/1927 | King | 280—99 |
| 2,497,357 | 2/1950 | Hunt | 280—99 |
| 2,675,247 | 4/1954 | Meng | 280—111 |
| 3,134,607 | 5/1964 | Doll | 280—111 |
| 3,183,991 | 5/1965 | Gamaunt | 280—111 |

BENJAMIN HERSH, *Primary Examiner.*

L. D. MORRIS, JR., *Assistant Examiner.*